United States Patent [19]

Klüting

[11] 4,225,177
[45] Sep. 30, 1980

[54] INERTIA ACTIVATED LOCKING DEVICE FOR VEHICLE SEATS

[75] Inventor: Bernd Klüting, Radevormwald, Fed. Rep. of Germany

[73] Assignee: Keiper Automobiltechnik GmbH & Co. KG, Remscheid-Hasten, Fed. Rep. of Germany

[21] Appl. No.: 953,611

[22] Filed: Oct. 23, 1978

[30] Foreign Application Priority Data

Oct. 24, 1977 [DE] Fed. Rep. of Germany ....... 2747584

[51] Int. Cl.² .................. B60R 21/10; A47C 31/00
[52] U.S. Cl. .................................... 297/216; 188/69; 248/429; 297/379
[58] Field of Search ............. 297/216, 379, 344, 330; 248/429, 430; 242/107.4 B, 107.4 C; 296/65 A; 188/69, 84, 180

[56] References Cited

U.S. PATENT DOCUMENTS

| 396,188 | 1/1889 | Anderson | 188/69 |
|---|---|---|---|
| 2,930,428 | 3/1960 | DeRose | 297/330 X |
| 2,942,647 | 6/1960 | Pickles | 297/330 X |
| 3,848,923 | 11/1974 | Dehler | 297/379 X |
| 3,851,837 | 12/1974 | Griffin | 188/180 X |
| 3,900,225 | 8/1975 | Wirtz et al. | 297/367 |
| 4,113,308 | 9/1978 | Werner et al. | 297/379 X |

FOREIGN PATENT DOCUMENTS

2127479  12/1971  Fed. Rep. of Germany ........... 297/362

Primary Examiner—William E. Lyddane
Attorney, Agent, or Firm—Michael J. Striker

[57] ABSTRACT

An inertia activated locking device for a motor vehicle seat of the type having a stationary part and an adjustable part, comprising a locking gear coupled to one part, a pinion meshing with the locking gear and being supported for free movement in an arcuate slot the center of curvature of which coincides with the center of rotation of the locking gear, and an arresting member spaced apart from an end of the arcuate slot at such a distance as to allow free rotation of the pinion when the locking gear rotates at a steady speed and to engage the pinion when the locking gear is abruptly accelerated so that it takes along the pinion as far as to the end of the slot facing the arresting member.

12 Claims, 11 Drawing Figures

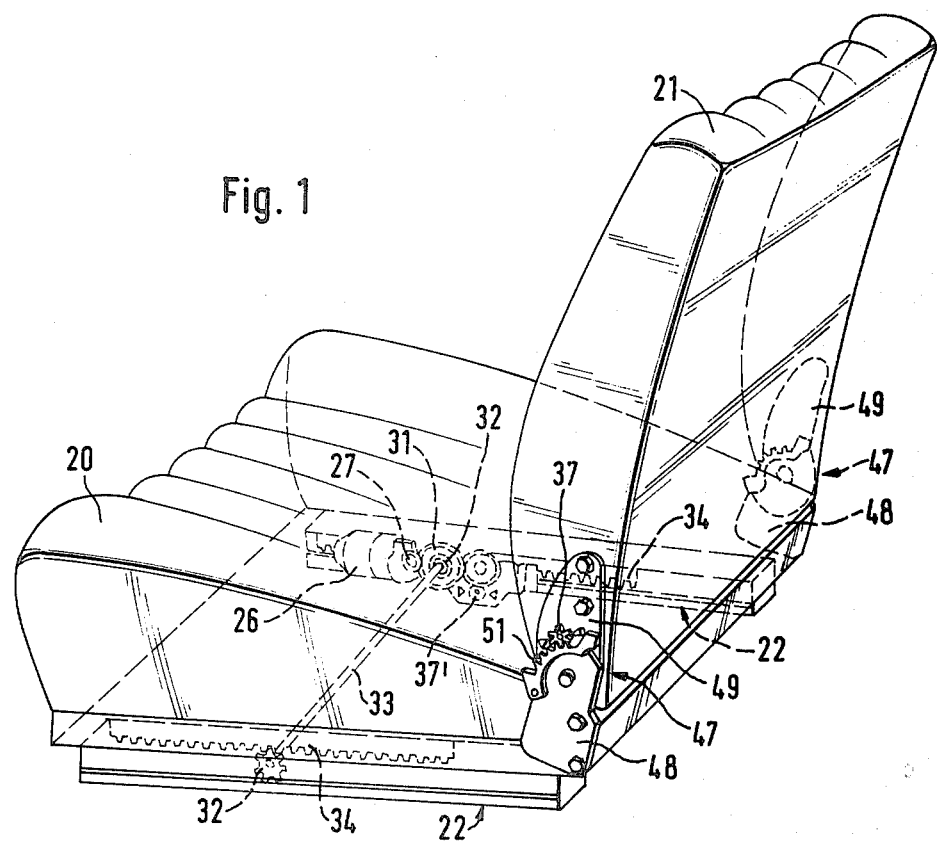
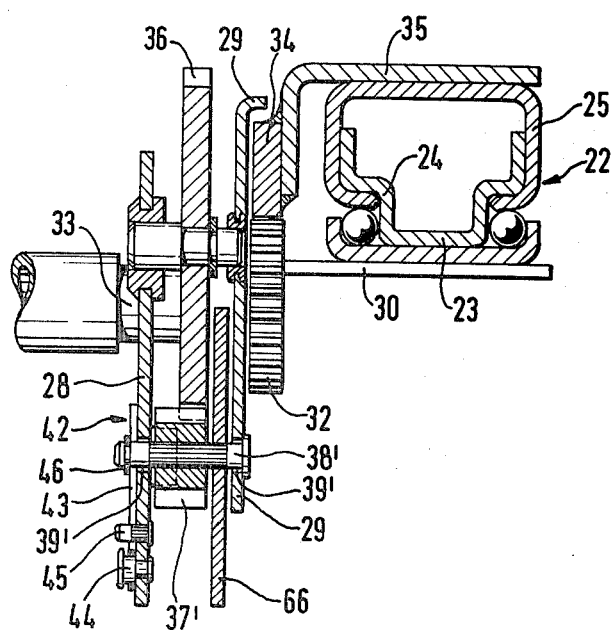

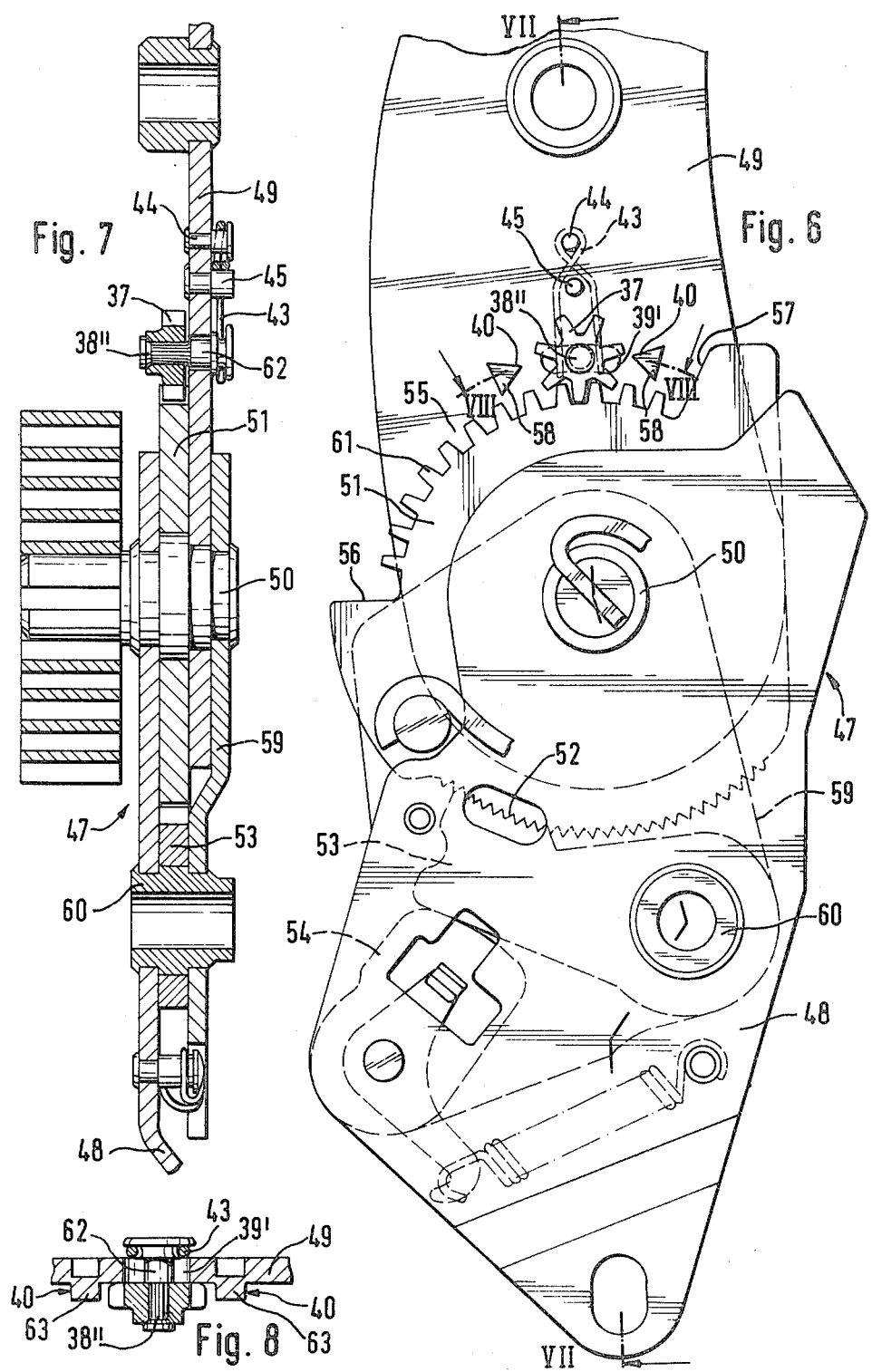

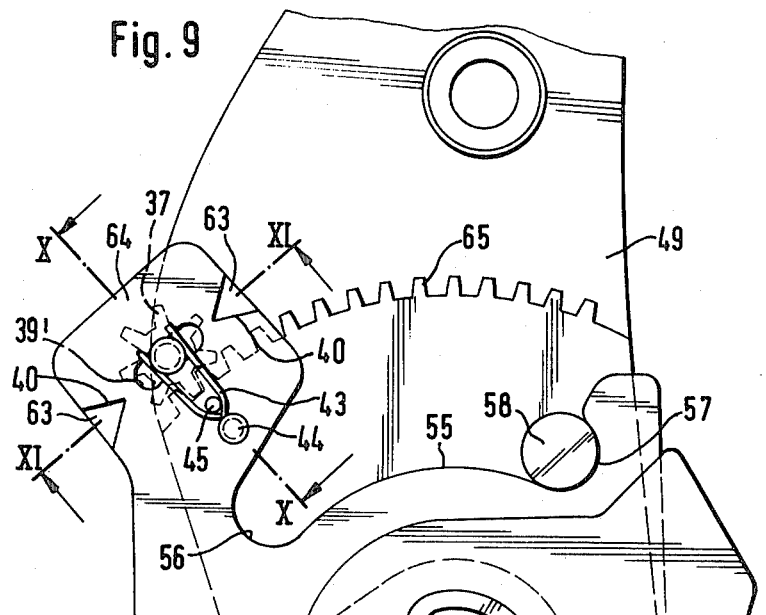

INERTIA ACTIVATED LOCKING DEVICE FOR VEHICLE SEATS

BACKGROUND OF THE INVENTION

The invention relates generally to safety devices for motor vehicles and more specifically, it relates to an inertia activated locking gear for motor vehicle seats of the type where the seat part is supported on a guiding rail assembly for movement in two opposite directions along the longitudinal axis of the vehicle, the rail assembly including supporting rails secured to the floor of the vehicle and a travelling rail slidably supported on the supporting rail and being connected with a position adjustment member that is movable by a displacement device that is stationary relative to the supporting rail.

In a conventional seat of the above-described type the travelling rail of the guiding rail assembly is connected to the lower portion of the seat and is also firmly secured to a toothed rack. The rack meshes with a pinion that is supported for rotation in the base part of the seat and is driven via a worm gear by an electromotor. In order to eliminate the maintenance of the employed worm gears the worm gear is made of a synthetic material. Moreover the worm gears are constructed in such a way that by virtue of their rigidity and their locking moment they are suitable for preventing the seat against displacement nonetheless due to excessive forces occurring in the case of an accident are frequently broken and as a consequence they may completely unlock the longitudinal movement mechanism of the seat and the danger of injury of the user of the seat is considerably increased.

SUMMARY OF THE INVENTION

It is, therefore, a general object of the present invention to overcome the aforementioned disadvantages.

More particularly, it is an object of the invention to provide a locking device for an adjustable seat that allows for trouble-proof and resistance-free actuation of the seat adjustment mechanism and in the case of occurrence of sudden acceleration or deceleration forces enables an automatic arresting of the seat or of the movable part of the seat.

In keeping with this objects and others which will become apparent hereafter, one feature of the invention resides, in the provision of an inertia activated locking device for motor vehicle seats, including a locking gear coupled to the driving part of the seat adjustment mechanism and meshing with at least one freely rotatable pinion, the pinion being supported for slidable movement in an arcuate slot the curvature of which is concentric with the locking gear, and at least one stationary arresting member spaced apart from an extremity of the arcuate slot at such a distance as to allow for free rotation of the pinion during the normal speed of movement of the adjustable part of the seat and in the case of sudden acceleration of the adjustable part to engage with the pinion when the locking gear is brought into abruptly accelerated rotation in direction against the arresting member whereby the pinion is slidably displaced into abutment against the end of the slot. In this manner it is insured that the inertia activated pinion during normal rotation of the locking gear rotates on the periphery of the locking gear without contacting the arresting member whereas during the abrupt change of the rotational movement of the gear the pinion, due to its inertia resisting the abrupt change of rotation, is carried by the gear without its own rotation so that its shaft is displaced into contact with one extremity of the slot and by doing so engages the tip of the arresting member so that the rotation of the gear is instantly brought to a full stop. By arresting the locking gear, the driving gear of the seat adjustment mechanism coupled thereto also stops rotating and the increased acceleration or deceleration forces acting on the movable part of the seat are transferred to the floor of the vehicle. In this manner the movement of the seat is prevented even in the case of an accident when the self-locking worm gear mechanism is broken.

In order to intercept suddenly occurring acceleration or deceleration forces as well as to arrest the rotary movement of the locking gear in any direction of its rotation, one embodiment of this invention provides for a locking device including a locking gear in mesh with two opposite pinions each being supported for free slidable movement in an arcuate slot the center of curvature of which coincides with the center of rotation of the locking gear; each pinion cooperates with a stationary arresting tooth. Preferably, the arcuate slots are directed upwardly and each slot is arranged above the assigned pinion at such a distance as to allow for free rotation of the pinion during normal rotational speed of the locking gear and to engage the pinion when the rotation of the gear is subject to an abrupt change.

The acceleration or deceleration forces acting in either of the two rotational directions of the locking gear can be intercepted also by means of a single inertia activated pinion. According to a further embodiment of the invention the single pinion engaging at an arbitrary point with the locking gear is supported for slidable movement at the center point of the arcuate slot having its center of curvature coinciding with the center of rotation of the locking gear and is held in its central position by means of a pressure spring exerting a restoring force whereby two pointed arresting members are fixedly arranged at both sides of the arcuate slot and in a spaced relationship to the pinion to engage, respectively, the pinion when the inertia exceeds the restoring force of the spring.

In the case of seats used in two-door motor vehicles, it is necessary that the backrest of the seat might be swung in front in order to enable passengers to enter the rear compartment of the car. For this purpose, as known, a lower mount assigned to the seat part is pivotably connected to the upper mount assigned to the backrest part of the seat whereby an arresting plate disposed between both mounting members is employed for adjusting the inclination of the backrest and fixes the same in a desired position by means of a locking pawl arranged at the lower mount. In addition the arresting plate is provided with two separate projections defining a recessed portion therebetween in which a stop member of a swingable linkage secured to the backrest is movable for limiting the swinging movement of the backrest both in the forward direction and in the backward direction.

According to another feature of the invention it is possible to prevent safely any additional forward movement of the backrest that may occur in the case of an accident by providing the recess of the arresting plate with a toothed segment meshing with the pinion that is shiftably arranged in the arcuate slot and held in a central position by means of a pressure spring. In the event of a jerking acceleration of the backrest in the direction of its swinging movement the pinion is moved against the restoring spring and engages a stationary arresting member that is arranged on the upper mounting piece assigned to the backrest.

In still another embodiment of this invention the pinion is supported for movement in an arcuate slot provided in the arresting plate itself and upon the latter are also mounted the two arresting members whereby the toothed segment meshing with the pinion is mounted on the mounting piece assigned to the backrest. In this manner, the forward swinging of the backrest that otherwise might occur during an accident is effectively prevented.

As it has been mentioned above, the pinion is supported for free wheeling in an arcuate slot the curvature of which matches the circumference of the locking gear so that no locking of the shaft of the pinion can take place. To insure in the case of actuation of the pinion by inertia that the arresting tooth readily enters a gap between the teeth of the pinion, according to a further feature of this invention the length of the arcuate slot defining the path of travel of the pinion in the direction of rotation of the locking gear corresponds approximately to the distance between the tip of the arresting member and the root line of the pinion. As it has been already mentioned, in the embodiment where the pinion is arranged for displacement in a substantially horizontally directed arcuate slot, the force of gravity acting upon the pinion as a position restoring force prevents the pinion during the normal speed of rotation of the locking gear or locking plate from being displaced into the slot and from engagement with the arresting member. Nonetheless to render the function of the inertia activated pinion independent from the effect of the force of gravity and at the same time to maintain safely the free running position of the pinion during its normal operation, a U-shaped spring contacts from both sides the shaft of the pinion and during normal operation holds the same in a central position in the slot whereas in the case of acceleration of the pinion due to inertia or in the case of reversed rotational movement of the locking gear the corresponding arm of the spring resiliently gives way to the increased force of the pinion and allows the same the engage with the arresting member. In this manner it is possible to employ only a single inertia activated pinion for locking the locking gear in either direction of its rotation.

According to still another feature of this invention, the free wheeling pinion is coupled to a flywheel that enhances the inertia of the pinion and inhibits abrupt changes in the rotary movement of the latter.

According to still another feature of the invention the number of component parts of the inertia activated locking device can be reduced by providing the arresting members in the form of projections on supporting elements for the flywheel and the pinion. The arresting members are preferably employed also as stopping members for limiting the tilting movement of the backrest and cooperate with projections on the upper mounting part assigned to the backrest.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a car seat displaceable parallel to the longitudinal axis of the car and having articulated mounts at its backrest for adjusting the inclination and tilting of the latter whereby the displacement mechanism as well as the articulated mounts are equipped with the inertia activated locking device of this invention;

FIG. 5 is a sectional rear view of the displacement mechanism of FIG. 4 taken along line V—V of FIG. 4;

FIG. 6 shows a side view of an articulated mount for the backrest of the seat including an inertia activated locking device of this invention;

FIG. 7 is a sectional rear view of the mount of FIG. 6 taken along line VII—VII in FIG. 6;

FIG. 8 is a sectional top view of the locking device of this invention taken along line VIII—VIII of FIG. 6;

FIG. 9 is a side view of another embodiment of the articulated mount for the backrest of the seat including another modification of the inertia activated locking device of this invention;

FIG. 10 is a rear view of the locking device of FIG. 9 taken along line X—X in FIG. 9; and FIG. 11 is another rear view of the locking device of FIG. 9 taken along line XI—XI of FIG. 9.

DESCRIPTION OF THE PREFERRED EMBODIMENTS

Figure 2:
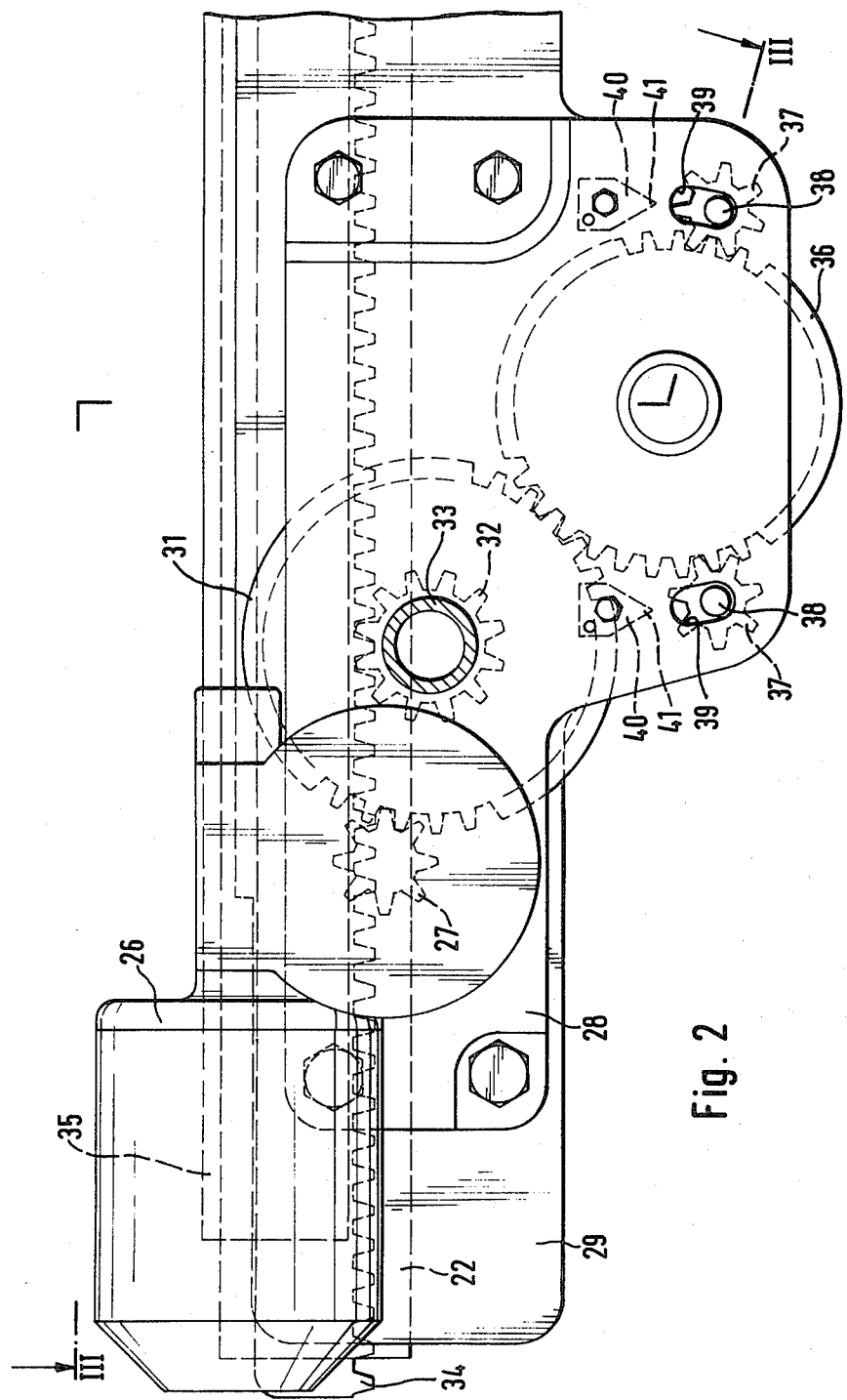
FIG. 2 is a side view of a displacement mechanism for the car seat including the locking device of this invention.
Figure 3:
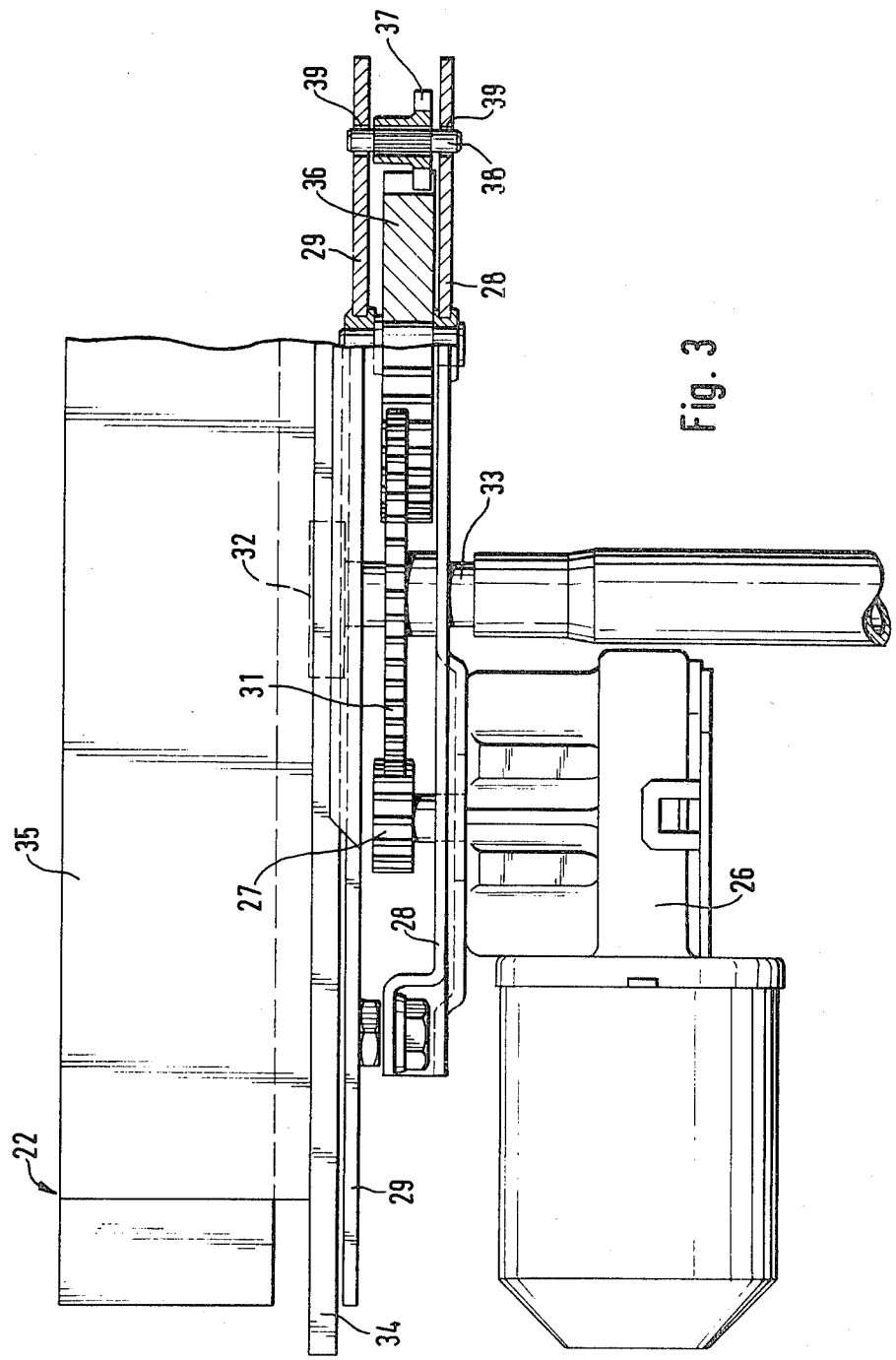
FIG. 3 is a top view partly in section taken along line III—III of the displacement mechanism of FIG. 2.

The motor vehicle seat shown in FIG. 1 consists of a seat part 20 and a backrest 21. The seat part 20 is connected by means of a guide rail assembly 22 to the floor (not shown) of a motor vehicle. The guide rail assembly 22 is arranged at each lateral side of the seat and consists as shown most clearly in FIG. 5, of a U-shaped supporting rail 23 rigidly connected at its central part with a profiled bearing rail 24 having S-shaped shoulders. A series of bearing balls is disposed on the supporting rails 23 below each shoulder of the bearing rail 24 and a C-shaped travelling rail 25 projects with its inwardly bent shoulders below the shoulders of the bearing rail 24 and rests on top of the bearing balls. The travelling rail 25 is fixed to the lateral sides of the longitudinally displaceable seat part 20 whereas the supporting rail that is secured to the floor of the car maintains its stationary position. The displacement of the travelling rail and thus of the seat relative to the car floor is effected by means of a drive motor 26, the driving pinion 27 of which projects through a bearing plate 28 in the direction of the guiding rail assembly 22. The motor 26 is mounted on the bearing plate 28 which is secured by means of spacing means to a supporting plate 29 that in turn is fastened by means of connecting strips 30 to the stationary supporting rail 23 (FIG. 5).

The driving pinion 27 projecting into the space between the bearing plate 28 and the supporting plate 29 meshes with a transmission gear 31 that is supported for rotation between the plates 28 and 29. The shaft 33 of the gear 31 projects through the supporting plate 29 and is firmly connected to a driving gear 32 that is in mesh with a toothed bar or rack 34 that is fastened by one or more connecting angles 35 to the travelling rail 25 of the guide rail assembly 22 so that the rotary movement of the driving gear 32 is transformed into longitudinal movement of the seat.

According to this invention, a locking gear 36 is supported for rotation between the bearing plate 28 and the supporting plate 29 and meshed with the transmission gear 31.

Referring now to the embodiments shown in FIG. 2 the locking device of this invention includes two locking pinions 37 and 38 arranged at opposite sides of the locking gear 36 and being supported for free rotation between the plates 28 and 29. In this embodiment, each pinion is supported in an arcuate slot 39 the center of curvature of which coincides with the center of rotation of the locking gear 36. Each arcuate slot 39 is directed in a substantially vertical direction so that the shaft 38 of each pinion 37 and 38 rests by the force of gravity on the lower extremity of the slot. Above the upper extremity of each slot 39 is arranged a pointed arresting member 40 that is fixedly attached to the bearing plate 28 by means of bolts or pins, for example. Each arresting member 40 has preferably the shape of a triangular plate the point 41 of which is arranged above the upper extremity of the arcuate slot 39 in such a manner that the pinions 37 and 38 in their normal position in which their shafts contact the lower extremity of the slots are free to rotate in mesh with the locking gear 36. The longitudinal dimension of each slot 39 corresponds approximately to the height of teeth of pinions 37. The spacing of the tip 41 of each arresting member 40 from the upper extremity of the arcuate slot 39 is selected so that the distance between the point 41 and the root circle of each pinion when the latter is in its normal operative condition in contact with the lower extremity of the slot corresponds approximately to the longitudinal dimension of the slot. The angle formed by the arms of the triangular arresting member 40 matches approximately the angle between the teeth of the pinion 37.

Provided that during an accident, for example, the seat part 20 together with the travelling rail 25 and the rack 34 secured thereto by connecting angles 35, is suddenly accelerated forwardly that means to the left in FIG. 2, the high acceleration forces may break the teeth of the transmission gear between the rack and the electromotor, or the worm gear coupled to the driving motor 26 so that the driving wheel 32 suddenly starts rotating counterclockwise. As a result also transmission gear 31 starts rotating counterclockwise and transmits this sudden rotary movement to the locking gear 36 that starts rotating clockwise. By the effect of this accelerated rotation, locking gear 36 takes along one of the pinions 37, in this example the left-side pinion 37 and displaces the same in the arcuate slot 39 upwardly as far as to the upper end of the slot. In this lifted position the teeth of the pinion 37 engage the tip 41 of the arresting member 40 and effectively prevent any movement of the locking gear 36 and consequently of the seat. The pinion 37 shown in FIG. 2 on the right side of the locking gear 36 is not displaced by the clockwise rotation of gear 36 from its normal position at the bottom end of the slot 39.

In the case of a sudden deceleration of the vehicle during which the self-locking teeth of the worm gears connected to the driving motor 26 become accidentally broken, the seating part 20 and the rack 34 move abruptly backward, that means to the right in FIG. 2, and the locking gear 36 starts suddenly to rotate counterclockwise. In this case the left-side pinion 37 remains in its normal position at the upper extremity of the slot 39 whereas the pinion arranged at the right side of the locking gear 36 is displaced in its slot 39 upwardly into engagement with the tip 41 of the right-hand arresting member 40. As a consequence, further backward motion of the seat is prevented in the same manner as described above in connection with the forward movement of the seat.

Figure 4:
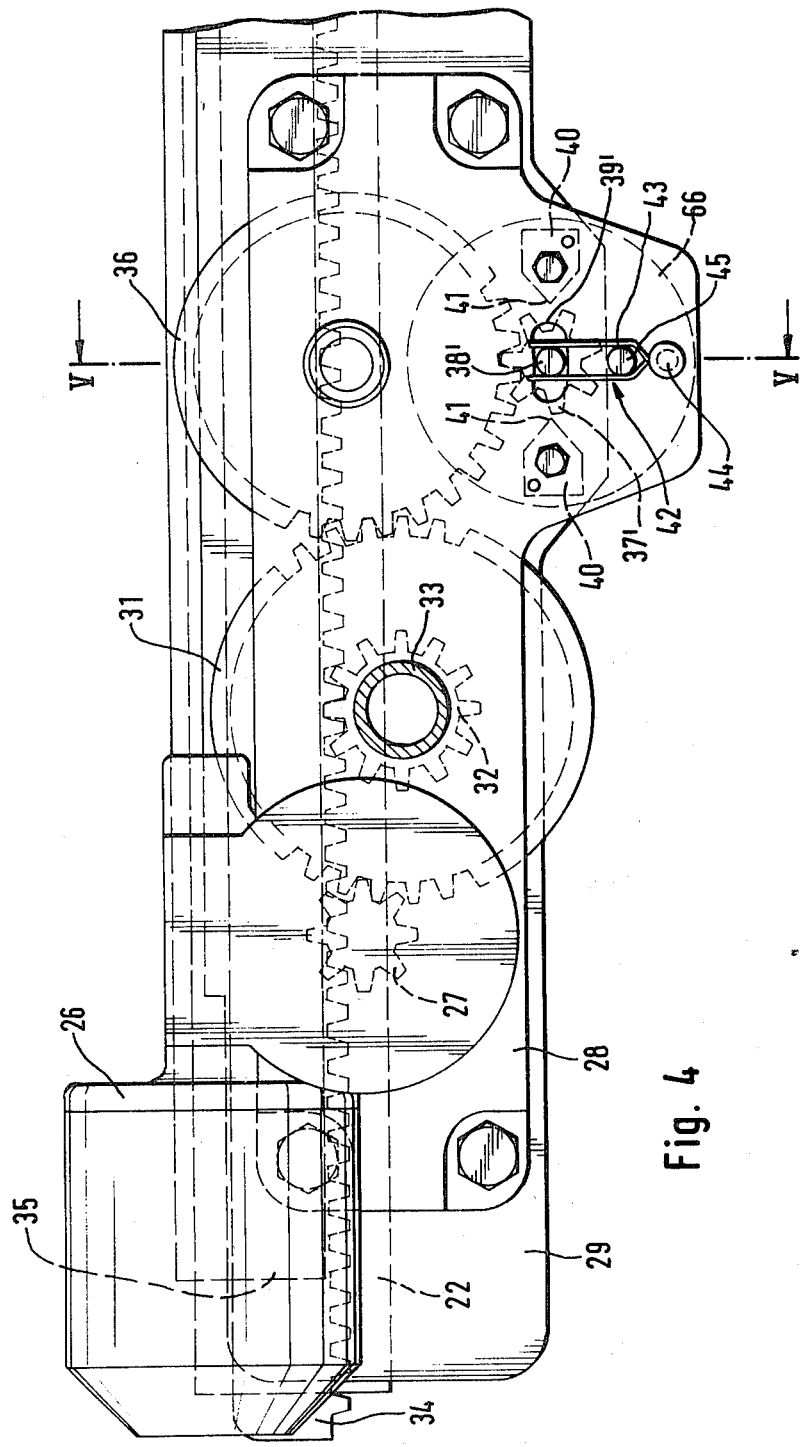
FIG. 4 is another embodiment of the displacement mechanism including a modified version of the inertia activated locking device of this invention, shown in a side view from a lateral side of the seat.

A modification of the inertia activated locking device of this invention is illustrated in FIGS. 4 and 5. In this embodiment, only a single pinion 37' meshes with the locking gear 36. The pinion 37' is rigidly connected to a shaft 38' that is supported for both a rotational and a sliding movement in an arcuate slot 39' which in this example is directed approximately in a horizontal direction and the center of its curvature coincides with the center of rotation of the locking gear 36. In this example, the arcuate slot is located underneath the locking gear 36 and extends substantially horizontally. The arresting members 40 are secured to the bearing plate 29 at each side of the slots 39 and face with their pointed ends 41 the ends of the slot. Shaft 38' of each pinion 37' is normally at the center of the slot 39 and can, therefore, be shifted both to the left and to the right. In order to maintain the central position of the pinion 37', an energy accumulator in the form of a U-shaped spring 42 is secured to the bearing plate 28 and contacts with its upwardly projecting resilient arms 43 both sides of shaft 38 of the pinion 37'. Preferably, the arms 43 of the spring 42 are connected by a loop encircling a supporting pin 44 and the bent part of the spring is held in position by another projecting pin 45. The spring arms 43 are held in position by means of a plate 46 (FIG. 5) secured to the shaft 38 of the pinion. The plate 46 thus prevents the spring 42 from springing off and inhibits axial movement of the shaft 38'. The arresting members 40, the tips 41 of which are directed toward the pinion 37', are spaced apart from each other about a distance that slightly exceeds the diameter of the crown circle of the pinion so that the latter is allowed for an unobstructed rotation between the arresting members 40. The unoccupied portions of arcuated slot 39' on each side of the shaft 38' correspond in length approximately to the length of teeth of the pinion 37'.

In the event of an abrupt acceleration of the rotation of the locking gear 37 in clockwise direction the pinion 37' is displaced in the slot 39 to the left against the resilient force of one arm 43 of the spring so that the point 41 of the left-hand arresting member 40 engages with the pinion 37' and stops the rotation of the locking gear 36. In a sudden change of the sense of rotation of the locking gear 36 in counterclockwise direction the pinion 37' is again without its own rotation pushed to the right against the resilient force of the right arm 43 of the spring 42 so that the tip 41 of the right-hand arresting member 40 meshes againg with the pinion 37' and locks the counterclockwise rotation of the locking gear 36. In this manner, any abrupt displacement of the seat 20 that may occur during an accident is effectively prevented.

In order to increase the inertia of pinions 37 or 37' in the event of an excesive acceleration or deceleration, it is advantageous as seen from FIGS. 4 and 5 to connect to the pinion 37' a flywheel 66. As seen particularly from FIG. 5, the shaft 38' carries both the pinion 37' and the flywheel 66. The mass of the flywheel 66 can be dimensioned in such a manner as to match particular conditions resulting from the use of different seats.

The seat part 20, as mentioned previously, is connected to the backrest 21 via a pair of articulated mounts 47. Each of the two articulated mounts 47 has a lower mounting portion 48 secured to the seat part 20 and an upper mounting portion 49 secured to the backrest. Both portions 48 and 49 are pivotally connected to each other to rotate about a swivel axis 50. At least one of the two articulated mounts 47 is provided with a locking disk 51 disposed between the two mounting portions 48 and 49 to adjust the inclination of the backrest. The lower portion of the locking disk 51 is provided with locking teeth 52 engaging corresponding teeth of a locking pawl 53 that is pivotally mounted to the lower mounting piece 48. The locking pawl 53 is in engagement with a spring-biased lever 54 urging the pawl 53 against the locking teeth 52 of the disk 51. The lever 54 is connected to a handle (not shown) by means of which the lever 54 is tilted clockwise downwardly against the force of its biasing spring so that the locking pawl 53 by its own weight falls out of engagement with the locking teeth 62 of the disk 51 and releases the backrest for angular adjustment. In the desired inclined position of the backrest 21 the handle is released so that the tension spring returns lever 54 into its position as illustrated in FIGS. 6–9 and in this position the locking pawl 53 is again in engagement with the teeth of the locking disk 51. In order to facilitate forward tilting of the backrest 21 independently from the adjusted inclined position of the latter so that in the case of a two-door motor vehicle the passengers may enter the rear compartment, the locking disk 51 has a recessed portion 55 delimited by two projections 56 and 57. A stop member 58 secured to the mounting piece 49 projects into the recessed portion 55 and the projections 56 and 57 limit its movement between the adjusted rearwardly inclined position and a forwardly tilted positon of the backrest. Mounting piece 49 as well as locking disk 51 are enclosed in a supporting cover plate 59 that provides for a symmetric support of the two parts. The cover plate 59 is connected to the mounting piece 48 assigned to the seat portion 20 by means of a swivel axis 50 and an attachment sleeve 60 supports the lock pawl 53 for rotation.

In the embodiments of the articulated mount as shown in FIGS. 6–8 the recessed portion 55 of the locking disk 51 is carried out in the form of a locking toothed segment 61 meshing with a pinion 37 supported for rotation on the mounting piece 49. The pinion 37 is fixed on a shaft 38" the projecting portion 62 of which is supported for driving movement in an arcuate slot 39' provided in the upper mounting piece 49. Similarly as in the preceding examples, the elongated slot 39' is curved in accordance with the circumference of the locking toothed segment 61 and defines a central portion in which the shaft 38" is normally held and two free spaces at either side of the shaft 38". The length of each free space of the slot 39 corresponds approximately to the length of the teeth of the pinion 37. Arresting members are secured to the mounting piece 49 at a spaced relation to the ends of the arcuated slots 39'. In the example shown in FIGS. 6–8 the arresting members 40 have the form of triangular plates 63 (FIG. 8) and each has its tip directed towards the assigned end of the slot 39'. The triangles 63 serve simultaneously as stop members 58 for limiting the tilting movement of the upper mounting piece 49 connected to the backrest. Also in this embodiment the shaft 38" of the locking pinion 37 is held in its central position in the slot 38' by means of a bar spring 43 the two arms of which contact from two opposite points the shaft 38". The U-shaped bar spring 43 has a loop encircling a pin 44 projecting from the mounting piece 49 and in addition the bent part of the spring is held in position by means of another pin 45 projecting from the piece 49. In the embodiment illustrated in FIGS. 6–8, the operational conditions of the inertia activated locking device are similar to those in the embodiment shown in FIG. 4.

When tilting the backrest backwards, that means to the right in FIG. 6, the stop member 58 secured to the mounting piece 49 at the right of the pinion 37 abuts against the projecting member 57 and prevents the backrest from further tilting rearwardly. If the backrest, however, is accelerated by inertia forwardly, that means to the left in FIG. 6, the accelerated force displaces the pinion 37 in arcuated slot 39' backwards so that the tip of the locking member 40 at the right from the pinion 37 engages the latter and prevents the backrest from further tilting in front. If, however, the mounting piece 49 is subject only to a steady force during its tilting the pinion 37 remains in its illustrated central position in the arcuated slot 39' and during the tilting movement of the backrest rotates in mesh with the locking toothed segment 71. The locking member 40 at the left side of the pinion abuts against the projection 56 of the locking disk 51. In this case the locking member 40 at the left side of the pinion 37 acts only as a stop member. In the event when abrupt and consecutive acceleration and deceleration impulses are applied to the backrest the locking member 40 arranged at the left from the pinion 37 can engage the latter in a locking position.

In the embodiment of the articulated mount 47 as illustrated in FIGS. 9–11, the pinion 37 is supported for rotation and for displacement in an oblong arcuate slot 39' provided in an extension 64 of the locking disk 51. Similarly as in the preceding examples, the arcuate slot 39' supports in its central portion the shaft 38" of the pinion 37 so that the latter can be displaced in the free space on both sides of the central region. Also, in this embodiment two triangular locking member 40 face respectively with their tips the ends of the arcuate oblong slot 39 and these locking members are formed in the form of bosses in the extension 64. As can be seen most clearly from FIGS. 9 and 10 the pinion 37 meshes with a toothed segment 65 provided on the mounting teeth 49. The pinion 37 also in this case is held in its central free-wheeling position by means of a pressure spring 42 so that if the mounting piece 49 is tilted steadily and without jerks forwardly or backwardly the pinion 37 freely rotates on the toothed segment 65. When abrupt acceleration or deceleration impulses occur, the pinion 37 is taken along by the toothed segment 65 and displaced in the corresponding direction in the arcuated slot 39 so that the corresponding locking member 40 can engage the teeth of the pinion 37 and stop the motion of the mounting piece 49.

It will be understood that each of the elements described above or two or more together, may also find a useful application in other types of constructions differing from the types described above.

While the invention has been illustrated and described as embodied in several specific examples of the inertia activated locking device, it is not intended to be limited to the details shown, since various modifications and structural changes may be made without departing in any way from the spirit of the present invention. For example, it is possible to apply the inertia activated locking device of this invention in a hand-operated adjustment device for the longitudinal displacement of the seat part 20. Furthermore, the application of the locking device for the longitudinal displacement of the motor vehicle seat can be made independent of the employment of the locking device in connection with the mounting pieces between the seat portion and the backrest portion of the seat. The locking device of this invention can be applied in the mechanism for longitudinal displacement of the seat parts 20 both at one side of the seat and at both lateral sides thereof. Also, it can be applied either at one side of the backrest or at either side of the latter for safeguarding its tilting movement.

What is claimed as new and desired to be protected by Letters Patent is set forth in the appended claims:

1. An inertia activated locking device for motor vehicle seats of the type having a stationary part, a movable part and means for adjusting and holding the position of said movable part relative to said stationary part, said device comprising a locking gear coupled to one of said parts; a pinion supported for free rotation in an oblong slot provided in the other part in operative proximity to said locking gear, said pinion being in engagement with said locking gear and freely rotatable about its axis when said locking gear rotates with a steady movement; at least one arresting member secured to said other part at such a distance from one extremity of said oblong slot as to allow free rotation of said pinion when said locking gear rotates with said steady movement and means to retain said pinion at said distance and to permit engagement of said pinion with said arresting member when the pinion is displaced due to accelerated movement of said one part relative to said other part, into abutment with said one extremity of said slot thus arresting the movement of said locking gear.

2. A device as defined in claim 1, wherein said oblong slot has an arcuate shape the center of curvature of which coincides with the center of rotation of said locking gear.

3. A device as defined in claim 2, wherein said adjusting and holding means include a stationary driving motor coupled to transmission gears, and said locking device including a pair of pinions supported in arcuate slots arranged in a substantially horizontal plane at two opposite sides of said locking gear, said arcuate slots being directed substantially vertically and said arresting members being pointed against the upper extremity of respective slots.

4. An inertia activated locking device for motor vehicle seats of the type having a stationary part, a movable part and means for adjusting and holding the position of said movable part relative to said stationary part, said device comprising a locking gear coupled to one of said parts; a pinion supported for free rotation in an oblong slot provided in the other part in operative proximity to said locking gear, said pinion being in engagement with said locking gear and freely rotatable about its axis when said locking gear rotates with a steady movement; said oblong slot having an arcuate shape the center of curvature of which coincides with the center of rotation of said locking gear; said pinion being supported in said arcuate slot and being in engagement with the locking gear; two arresting members arranged respectively at operative proximity to the ends of said arcuate slot; and a holding spring arranged for resiliently holding said pinion at a central region of said slot so that the pinion rotates freely during a steady movement of said locking gear whereas during an accelerated movement is taken along by the locking gear and displaced into engagement with a corresponding arresting member.

5. A device as defined in claim 4, wherein said holding spring is in the form of a U-shaped spring the resilient arms of which project above the shaft of said pinion to allow for the displacement of said pinion in both rotational directions of said locking gear.

6. A locking device for motor vehicle seats of the type having a stationary supporting part, a movable seating part coupled to said supporting part and a foldable backrest coupled to said seating part by means of articulated mounting portions including a locking disk held in an adjusted inclined position by a manually controllable arresting pawl, said locking disk including a recessed portion having at its ends projecting abutment members, one of the articulated portions supporting two stop members projecting into said recessed portion and cooperating with said projecting abutment members to delimit the forward and backward tilting movement of said backrest, said locking device including a toothed segment provided in said recessed portion of said locking disk; a pinion engaging said toothed segment; an arcuate slot provided in the mounting portion for supporting said pinion; a pair of arresting members each facing a corresponding end of said arcuate slot and being spaced apart from each other at such a distance as to permit a free rotation of said pinion when said toothed segment rotates with a steady speed; and a holding spring secured to said mounting portion to hold said pinion in a central position in said slot and to resiliently allow for displacement of said pinion when the latter is taken along by the accelerated toothed segment.

7. A device as defined in claim 6, wherein said locking disk has a projection provided with said arcuate slot for supporting said pinion, said pair of arresting members and said holding spring for said pinion being fixedly arranged on said projection; and said toothed segment being provided on the mounting portion assigned to said backrest and being in engagement with said pinion.

8. A device as defined in claim 6, further comprising a flywheel fixedly supported on a common shaft with said pinion.

9. A device as defined in claim 6, wherein said arresting members have a prismatic shape with a pointed tip directed towards an assigned end of said arcuate slot and a side of each member opposite said pointed tip acting as a stop member for the projections on said locking disk of said backrest.

10. A device as defined in claim 6, wherein said arresting member has a prismatic configuration with one point facing the end of said slot.

11. A device as defined in claim 10, wherein the length of the unoccupied space in said slot corresponds approximately to the distance between the point of said arresting member and the root circle of said pinion.

12. A device as defined in claim 10, wherein the arresting members have the form of bosses provided on a supporting member for said pinion.

* * * * *